United States Patent
Powilleit

[15] 3,693,763
[45] Sept. 26, 1972

[54] SELF-ENERGIZING DISK BRAKE FOR AUTOMOTIVE VEHICLES

[72] Inventor: Hansherger Powilleit, Erkrath-Unterbach, Germany

[73] Assignee: International Harvester Company, Chicago, Ill.

[22] Filed: June 11, 1970

[21] Appl. No.: 45,454

[52] U.S. Cl. ............188/71.4, 188/72.2, 192/70;149
[51] Int. Cl. ...............................................F16d 55/04
[58] Field of Search ...........188/1 B, 71.4, 72.2, 73.5; 192/70, 70.17, 149, 109 R

[56] References Cited

UNITED STATES PATENTS

| | | | |
|---|---|---|---|
| 3,543,886 | 12/1970 | Campbell | 188/71.4 |
| 3,548,984 | 12/1970 | Root | 192/70.17 |
| 3,512,614 | 5/1970 | Powilleit et al. | 192/70 |

Primary Examiner—George E. A. Halvosa
Attorney—Floyd B. Harman

[57] ABSTRACT

A self-energizing disk brake having a pair of thrust plates positioned within a stationary housing and between brake disks connected to a shaft to be decelerated. An actuating means to rotate the plates relative to each other to cause spherical balls trapped in complementary indentations in the facing surfaces of the plates to push the plates apart against the bias of a spring means into frictional engagement with the brake disks. Centering cams and lugs on the plates are capable of selective engagement with guide surfaces and projections formed on the housing. The cams and lugs are provided with yieldable vibration dampening elements having a low coefficient of friction to minimize the axially directed forces resisting separation of the plates.

3 Claims, 2 Drawing Figures

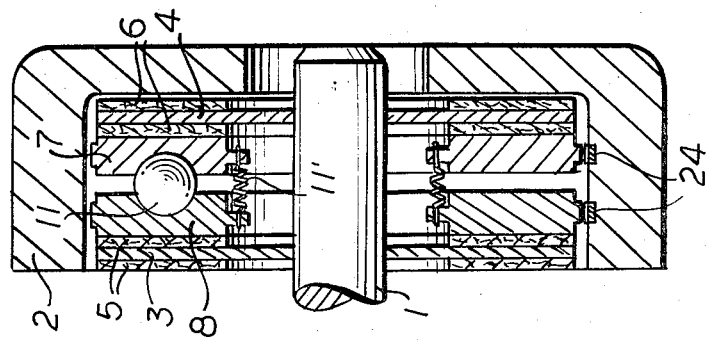
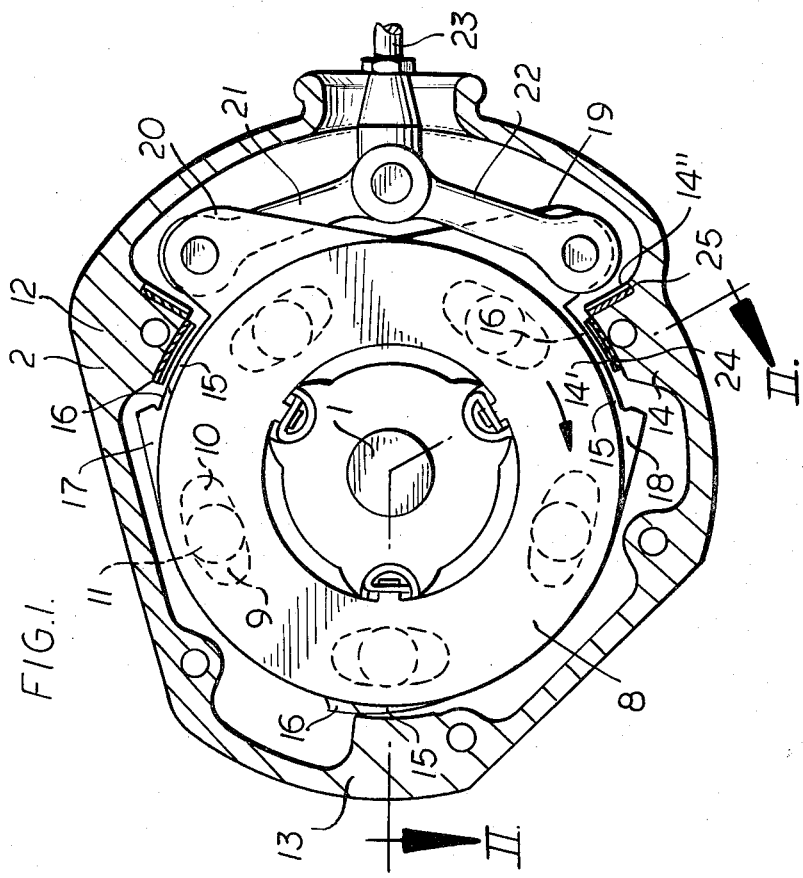

SELF-ENERGIZING DISK BRAKE FOR AUTOMOTIVE VEHICLES

CROSS REFERENCE TO RELATED APPLICATION

This application is related to a copending application of Hansherger Powilleit and Edmund Dohr, Ser. No. 733,875 filed June 3, 1968, now U.S. Pat. No. 3,512,614, entitled SELF-ENERGIZING DISK BRAKE FOR AUTOMOTIVE VEHICLE and assigned to the assignee of this application.

BACKGROUND AND SUMMARY OF THE INVENTION

This invention relates to disk brakes of the kind in which two cooperating thrust plates are accommodated within a stationary housing in parallel relationship with one another. The thrust plates are located between the brake disks which are connected to a shaft to be decelerated, and balls are located in conical or inclined recesses or depressions in the adjacent faces of the thrust plates. The application of the brake is initiated by rotating the plates relative to each other which causes the balls to urge the plates apart until they are in frictional engagement with the brake disks. The plates then tend to rotate with the rotating member i.e., the shaft and the brake disks attached thereto, until one plate engages with the stationary projection on the brake housing which holds it against further angular movement while the frictional force, imparted to the other plate through its engagement with the brake disk, causes continued angular movement of this other plate, which is referred to as the servo plate. This results in still further relative angular movement between the thrust plates causing the balls to urge the plates still further apart and to thereby produce a self-energizing action to apply the brake.

It is common practice to provide, in the brake housing, angularly spaced pilot lugs, generally three in number and spaced at equal angles around the rotating shaft, extending radially inward to maintain the plates in a central position with respect to the housing, the plates being in sliding engagement with the lugs. The plates also carry radial projections which are engageable with abutment faces on a lug to form a stop for one or the other of the plates according to the direction of rotation of the shaft.

When angular movement of the plate is arrested in the application of the brake, the plate assembly tends to pivot about the stop abutment and the plates are forced against another of the pilot lugs so that axial movement of both plates and axial and angular movement of the energizing plate is impeded. Since this results in a tangential force on the energizing or servo plate in a direction opposite to the rotation of the servo plate, the self-energizing effect is diminished or completely destroyed and a greater effort has to be applied by the operator to the brake pedal.

During the normal operation of disk brakes of the kind described, the braking operation itself affects a centering action between the two thrust plates by means of the expander balls which are located in the recesses on the thrust plates. Consequently, there are two centering actions which may take place; the centering of the thrust plates with respect to one another by means of the balls located in the recesses, and the centering of the thrust plates within the housing by the action of the centering cam. Where there are manufacturing inaccuracies in the diameters of the balls or the recesses in the thrust plates, or inaccuracies in the manufacture of the centering cams on the thrust plates or in relation to the position of the individual center axes of any of these parts, a double centering of the thrust plates at the guide surfaces of the housing projections is involved. That is, the centering cams of both thrust plates are acting to effect centering. The result of double centering is to create tangential and radial forces and, consequently, high frictional forces which act against or destroy self-energization and thereby considerably reduce the brake effort. These radial and tangential forces have been largely eliminated, or at least substantially reduced, by the structure disclosed and claimed in the aforementioned cross referenced application.

It has been found subsequently that the inner frictional forces existing in the disk brake can be reduced still further if, in addition to the tangential and radial forces, the axial forces acting on the thrust plates can also be reduced. The axial forces are caused by contact between the guide faces and to some extent the housing projections, when the thrust plates are expanded axially.

It is, therefore, an object of the present invention to provide a disk brake of the kind described in which a substantial reduction in undesirable frictional forces is obtained without abandoning a reasonably exact control of the braking effort.

It is also an object of the present invention to provide a disk brake of the kind described wherein the forces acting in an axial direction tending to resist separation of the thrust plates is substantially reduced.

These and other objects of the present invention will be more readily apparent upon a perusal of the following description and the accompanying drawings, wherein:

FIG. 1 is a section view of the brake taken transverse to the shaft to be braked thereby, and FIG. 2 is a cross section taken on lines II—II of FIG. 1.

DESCRIPTION OF A PREFERRED EMBODIMENT

Referring to FIGS. 1 and 2, there is shown a disk brake of the kind described which is suitable for installation, for example, in the rear axle housing of a tractor. A shaft 1, which may be a tractor axle, is mounted for rotation within a housing 2, and has a pair of disks 3 and 4 retained on the shaft; each disk having brake linings 5 and 6.

Two thrust plates 7 and 8 are located between the brake disks 3 and 4, and opposing complementary recesses 9 and 10 are provided on the inner faces of the thrust plates 7 and 8. Each pair of opposing recesses 9 and 10 contains a spherical ball 11. Thrust plates 7 and 8 are normally drawn toward each other by means of the springs 11', and the recesses containing the balls cause the thrust plates 7 and 8 to be centered with respect to each other. The housing 2 has three equiangularly spaced housing projections or lugs 12, 13 and 14 for guiding the thrust plates 7 and 8. In order to assist this guiding action, each of the thrust plates 7 and 8 has, on its circumference, three corresponding centering cams 15 and 16, respectively. Two of the three housing projections, namely, the housing projections 12 and 14, simultaneously constitute stops for the lugs 19 and 20, respectively formed on the thrust plates 7 and 8. Connected to the lugs 19 and 20 are the outer ends of two toggle levers 21 and 22. The inner ends of the toggles 21 and 22 are pivotally connected to each other and to a pull rod 23. Pull rod 23 extends through the housing 2 and is connected to a brake pedal, not shown on the drawings, for manipulation by the operator.

When the disk brake is operated, the brake pedal is depressed so as to direct the pull rod outwardly with respect to the housing 2. The toggle levers 21 and 22 therefore rotate the lugs 19 and 20 toward each other, and thus cause the thrust plates 7 and 8 to turn relative to each other so that the balls 11 run up on the incline of the recesses 9 and 10. Thrust plates 7 and 8 are thereby forced away from one another against the bias of the springs 11'. Axial expansion or displacement of the thrust plates 7 and 8 takes place and the actual braking effect is obtained by the thrust plates 7 and 8 engaging with the brake linings 5 on the brake disks 3 and 4.

Axial movement of the plates will be resisted by frictional force because the stationary plate is in contact with one of the guide surfaces and one of the projections. In order to minimize this frictional force resisting axial movement, a yieldable, vibration dampening element 24 is secured to at least the guide surface 14' of the projection 14 and to the guide surface of projection 12. Each element 24 consists of an outer metal strip or layer and an inner layer of rubber, for example, which inner layer is fastened to the guide surface and the outer layer by means of vulcanizing or gluing. The inner layer is elastic and yieldable while the outer layer provides a low coefficient of friction material in contact with the thrust plate. Hence, the axial frictional forces arising due to the radial motions of the thrust plates are minimized because the coefficient of friction is low and also because the yieldable nature of the inner layer can smooth the radial or normal forces, which fluctuate widely when chatter occurs for instance. The net result is that the frictional forces which tend to resist axial movement of the stationary plate can be maintained at a minimum. Even more favorable results can be obtained if, in addition to the element 24 being provided on the guide surfaces, a similar element 25 is provided at the stop face of each of the projections 12 and 14, such as indicated at 14'.

What is claimed is:

1. In a self-energizing disk brake having a housing, a pair of thrust plates positioned within the housing, discs positioned between the plates and housing and connected with a shaft to be decelerated, said housing having a pair of radial projections each of which includes a guide surface and a stop face and each of said thrust plates includes a centering cam and a lug, the centering cam and lug on each thrust plate capable of engaging with the guide surface and stop face on one projection, the improvement comprising:

a yieldable, vibration dampening element secured to each of said stop faces and said guide surfaces for engagement by said lug and centering cam respectively.

2. A disk brake according to claim 1 wherein said element comprises an outer metal layer and an inner layer of rubber.

3. A disk brake according to claim 2, wherein the rubber layer is vulcanized to the outer layer and to the housing.

* * * * *